United States Patent
Fay, II

(10) Patent No.: US 11,191,213 B2
(45) Date of Patent: Dec. 7, 2021

(54) FLOATATION ADJUSTMENT ARRAY FOR HARVESTER AND METHODS OF USING THE SAME

(71) Applicant: CNH INDUSTRIAL AMERICA LLC, New Holland, PA (US)

(72) Inventor: Jeffrey Brown Fay, II, Oxford, PA (US)

(73) Assignee: CNH Industrial America LLC, New Holland, PA (US)

( * ) Notice: Subject to any disclaimer, the term of this patent is extended or adjusted under 35 U.S.C. 154(b) by 153 days.

(21) Appl. No.: 16/407,273

(22) Filed: May 9, 2019

(65) Prior Publication Data
US 2020/0352102 A1 Nov. 12, 2020

(51) Int. Cl.
| A01D 41/14 | (2006.01) |
| A01B 63/00 | (2006.01) |
| A01D 34/28 | (2006.01) |
| A01D 34/74 | (2006.01) |
| A01D 67/00 | (2006.01) |

(52) U.S. Cl.
CPC .......... *A01D 41/145* (2013.01); *A01B 63/008* (2013.01); *A01D 34/283* (2013.01); *A01D 34/74* (2013.01); *A01D 67/00* (2013.01)

(58) Field of Classification Search
CPC .... A01D 34/74; A01D 34/283; A01D 41/145; A01D 34/26; A01D 67/00; A01B 63/008; A01B 61/046; A01B 63/166
See application file for complete search history.

(56) References Cited

U.S. PATENT DOCUMENTS

| 3,168,800 | A |   | 2/1965 | Dyrdahl |   |
| 3,589,116 | A | * | 6/1971 | Speiser ................ | A01D 75/306 56/249 |
| 3,599,406 | A |   | 8/1971 | Akgulian et al. |   |
| 4,085,571 | A |   | 4/1978 | Mortier et al. |   |
| 4,206,582 | A | * | 6/1980 | Molzahn ................ | A01D 57/00 56/15.8 |
| 4,206,584 | A | * | 6/1980 | Johnson ................ | A01D 41/14 56/15.8 |

(Continued)

FOREIGN PATENT DOCUMENTS

| DE | 1185410 B | 1/1965 |
| EP | 2436256 A1 | 4/2012 |

(Continued)

*Primary Examiner* — Thomas B Will
*Assistant Examiner* — Madeline Ivy Runco
(74) *Attorney, Agent, or Firm* — Peter Zacharias; Patrick Sheldrake

(57) ABSTRACT

A header floatation system that includes a floatation mechanism which includes a first end and a second end opposite the first end, a first floatation adjustment array which includes at least a first contact point, a floatation mechanism mount which includes at least a second contact point, and a floatation mechanism fastener. The first end of the floatation mechanism can be mechanically linked to the floatation mechanism mount. Either the first floatation adjustment array or the floatation mechanism mount can include a third contact point. The floatation mechanism fastener can be positioned adjacent to, on, or through at least the first or second contact points aligning contact between the floatation mechanism mount and the first floatation adjustment array.

16 Claims, 11 Drawing Sheets

(56) References Cited

U.S. PATENT DOCUMENTS

| | | | | |
|---|---|---|---|---|
| 4,227,363 A * | 10/1980 | Kerber | A01D 41/145 56/10.2 E |
| 4,429,750 A * | 2/1984 | Pope | A01B 21/08 172/157 |
| 4,676,053 A * | 6/1987 | Pruitt | A01D 67/00 172/466 |
| 5,157,905 A * | 10/1992 | Talbot | A01D 41/14 56/15.9 |
| 5,327,709 A | 7/1994 | Webb | |
| 5,351,635 A * | 10/1994 | Hulicsko | A01B 61/046 111/135 |
| 5,431,232 A * | 7/1995 | Kirsch | A01B 49/027 111/130 |
| 5,566,535 A * | 10/1996 | Pruitt | A01D 67/005 56/15.1 |
| 6,055,800 A * | 5/2000 | Walch | A01D 34/661 56/16.7 |
| 6,244,027 B1 | 6/2001 | McClure et al. | |
| 6,250,055 B1 * | 6/2001 | Franet | A01D 34/661 56/14.9 |
| 6,655,118 B1 * | 12/2003 | Thompson | A01D 43/107 56/15.8 |
| 7,047,714 B1 * | 5/2006 | Stephenson | A01D 34/64 56/15.2 |
| 7,520,115 B2 * | 4/2009 | Coers | A01D 41/141 56/15.8 |
| 7,596,935 B2 * | 10/2009 | Bollinger | A01D 34/661 56/14.9 |
| 7,603,837 B2 * | 10/2009 | Ehrhart | A01D 34/283 56/10.2 E |
| 7,857,072 B2 * | 12/2010 | Kovach | A01C 7/203 172/196 |
| 7,971,420 B1 * | 7/2011 | Bollin | A01D 41/145 56/208 |
| 9,095,093 B2 * | 8/2015 | Hyronimus | F16C 11/04 |
| 9,179,591 B2 * | 11/2015 | Barnett | A01B 69/003 |
| 9,370,137 B2 * | 6/2016 | Hennes | A01B 23/046 |
| 2014/0251192 A1 * | 9/2014 | Dietrich, Sr. | A01C 21/002 111/121 |
| 2016/0014963 A1 * | 1/2016 | Totten | A01D 41/141 56/208 |

FOREIGN PATENT DOCUMENTS

| | | |
|---|---|---|
| GB | 1374702 A | 11/1974 |
| GB | 773378 A | 4/1995 |

* cited by examiner

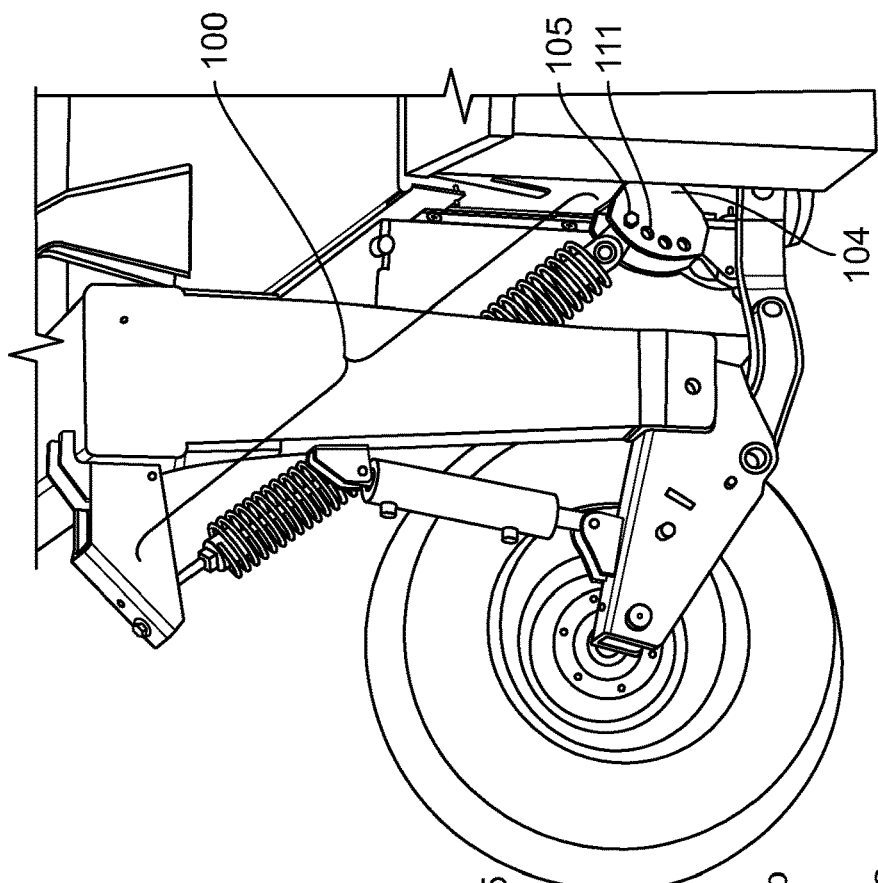
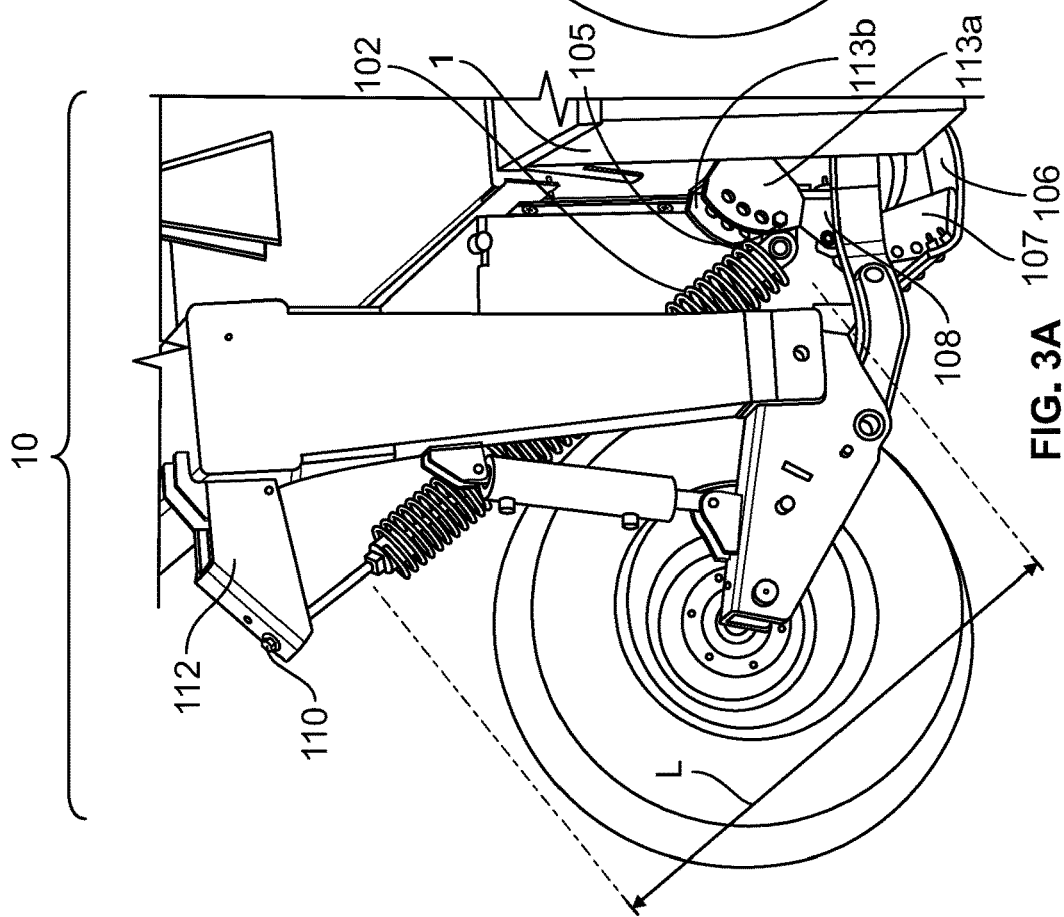
FIG. 3A
FIG. 3B

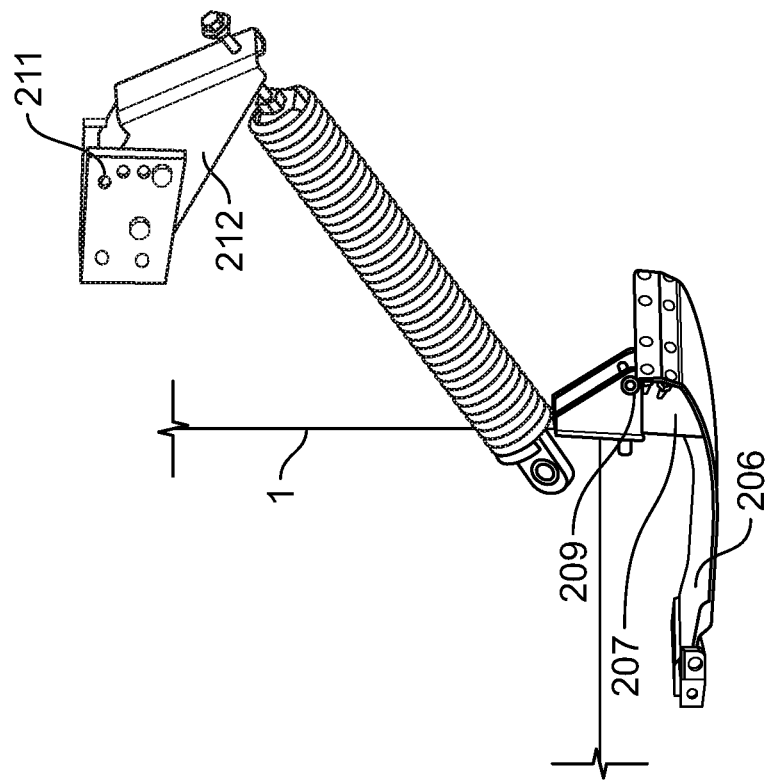
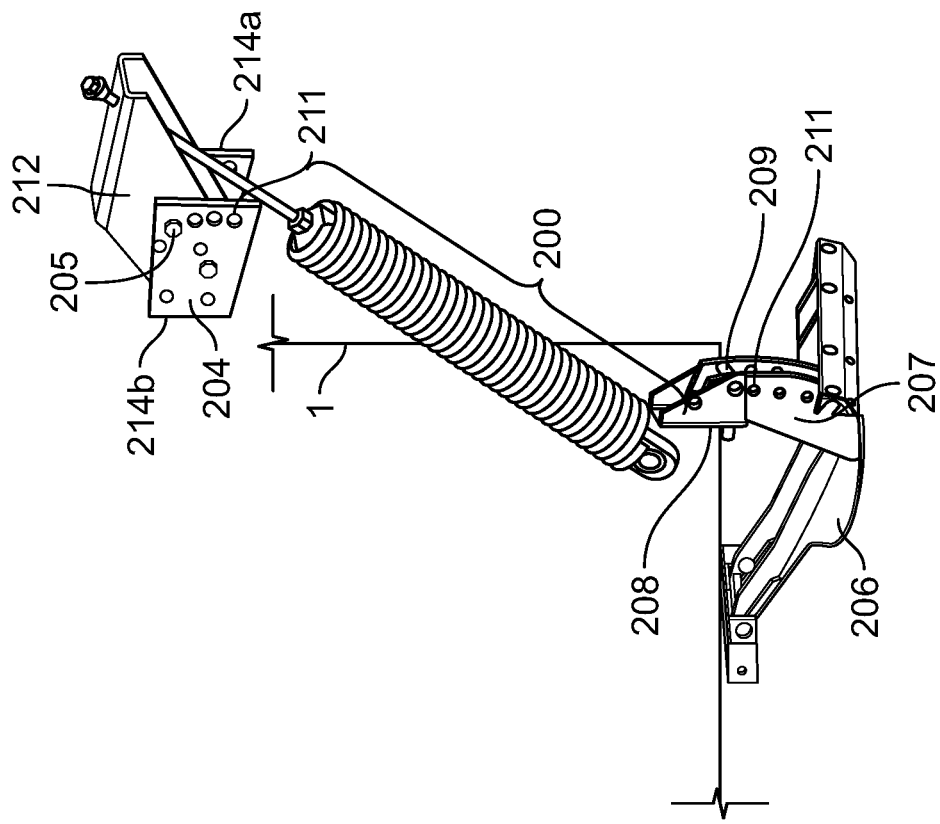

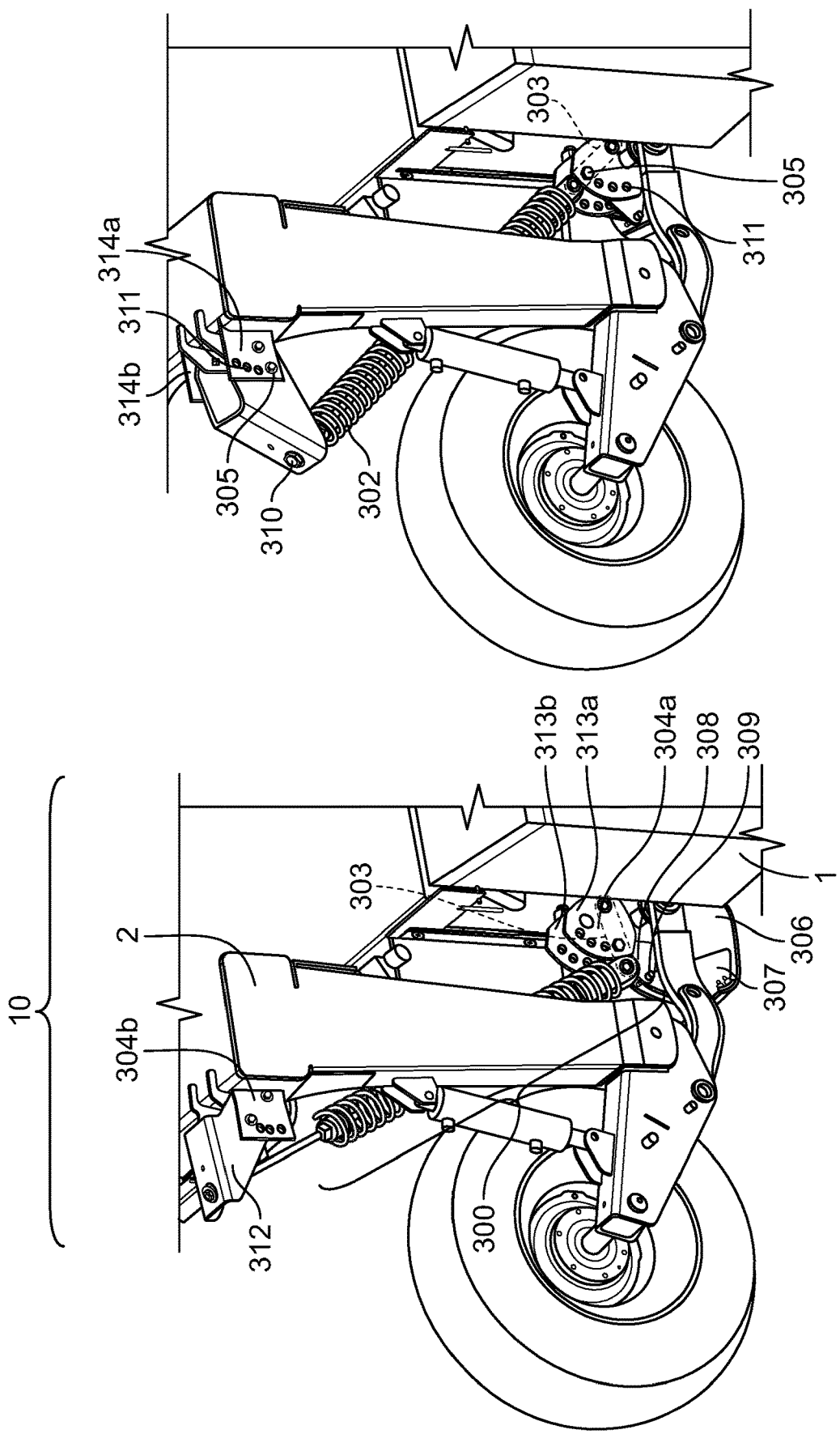

FLOATATION ADJUSTMENT ARRAY FOR HARVESTER AND METHODS OF USING THE SAME

FIELD OF INVENTION

The present invention relates to a header floatation system and a system for using the header floatation system. The header floatation system comprises a floatation adjustment array, a floatation mechanism, a floatation mechanism mount, and a floatation mechanism fastener. The present invention relates to a header floatation system capable of being used on an agricultural mower.

BACKGROUND

For many years agricultural mowers have featured adjustable skid shoe systems. These mowers are typically attached to and pulled behind an agricultural vehicle, such as a tractor. The adjustable skid shoe systems allow an operator to make adjustments to the cut height by adjusting the skid shoes which are typically connected to the bottom surface of the cutter bar, which is typically located on the underside of the header.

Some adjustable skid shoe systems operate by having an operator manually raise or lower the skid shoes. While such skid shoe adjustments can be quickly and easily done by the operator, with or without tools, they greatly affect the floatation of the header and, consequently, the cutter bar. For example, when such a skid shoe is adjusted down, the header and cutter bar height rises, which in turn reduces the elongation of the floatation springs. This elongation reduces the floatation force that the floatation springs apply to the header, thus increasing the ground force on the cutter bar. This problem is exacerbated by the design of most modern adjustable skid shoes, which tend to have a much smaller ground contact area than traditional skid shoes, which tended to be mounted over nearly the entirety of the bottom of the cutter bar.

Adjusting the floatation of the header to correspond with a change in header and cutter bar height can be complicated and require costly tools and mechanisms. An operator is unable to manually adjust traditional floatation mechanisms without tools to achieve a suitable floatation force for an adjusted header and cutter bar.

SUMMARY

An aspect of the present disclosure is a header floatation system. The header floatation system includes a floatation mechanism, a first floatation adjustment array, a floatation mechanism mount, and a floatation mechanism fastener. The floatation mechanism includes a first end and a second end opposite the first end. The first floatation adjustment array includes at least a first contact point. The floatation mechanism mount includes at least a second contact point. The first end of the floatation mechanism is mechanically linked to the floatation mechanism mount. The first floatation adjustment array or the floatation mechanism mount comprise a third contact point. The floatation mechanism fastener is positioned adjacent to, on, or through at least the first or second contact points aligning contact between the floatation mechanism mount and the first floatation adjustment array in a first operable mode.

In some embodiments, the header floatation system includes a second floatation adjustment array. The first floatation adjustment array is mechanically linked to the first end of the floatation mechanism and the second floatation adjustment array is mechanically linked to the second end of the floatation mechanism.

In some embodiments, the first floatation adjustment array includes a plurality of contact points. The contact points are holes through which the floatation mechanism fastener is positioned defining an operable height of the first floatation adjustment array. The contact points are arranged in a circumferential, radial or substantially vertical path along a portion of the first floatation adjustment array.

In some embodiments, the floatation mechanism includes a tension component chosen from: a coil spring, a torsion spring, an air spring, and a hydraulic actuator.

In some embodiments, the header floatation system is adjustable in height in at least a first and a second operable mode. In the first operable mode, the floatation mechanism mount and the floatation adjustment array are positionally aligned and operably linked by the floatation mechanism fastener at the first contact point. In the second operable mode, the floatation mechanism mount and the floatation adjustment array are positionally aligned and operably linked by the floatation mechanism fastener at the third contact point.

In some embodiments, the floatation mechanism is movable to a third operable position at a height sufficient to release all or substantially all tension in the floatation mechanism.

In some embodiments, the first floatation adjustment array includes at least two contact points. The floatation mechanism mount is movable relative the first floatation adjustment array such that alignment of at least one contact point of the first floatation adjustment array and at least one contact point of the mount determines the length of the floatation mechanism.

In some embodiments, the first floatation adjustment array includes a first and second opposite facing protrusions defining a space therebetween, each of the first and second protrusions comprising a plurality of contact points arranged in a circumferential, radial or substantially vertical path adjacent to a leading edge of the first and second protrusions. At least a first set of contact points on the first protrusion are paired and aligned on a substantially horizontal axis with a first set of contact points on the second protrusion at a first height. At least a second set of contact points on the first protrusion are paired and aligned on a substantially horizontal axis with a second set of contact points on the second protrusion at a second height. The floatation mechanism mount is positioned in the space between the first and second protrusions, fixed at a pair of contact points on the first and second protrusions by the fastener, and movable between at least the first and second heights at the first and second set of contact points. The contact points are holes through which the fastener is positioned to define an operable position.

In some embodiments, the header floatation system includes an eccentric mount operably connected to at least either the first or the second end of the floatation mechanism and movable to a plurality of positions such that moving the eccentric mount from one position to another position adjusts the tension in the floatation mechanism.

Another aspect of the present disclosure is a mower including a tongue and a header floatation system. The header includes a trail frame, a header including a cutter bar located generally on the underside of the header, a floatation mechanism, a first floatation adjustment array, a floatation mechanism mount, and a floatation mechanism fastener. The floatation mechanism is operably connected to the header at one end of the floatation mechanism and operably connected to the trail frame at an opposite end of the floatation mechanism. The first floatation adjustment array includes at least a first contact point. The floatation mechanism mount is mechanically linked to the trail frame or the header and includes a second contact point. The trail frame and the header are mechanically linked by at least one pivot point. The floatation mechanism is mechanically linked to the trail frame or the header. Either the first floatation adjustment array or the floatation mechanism mount include at least a third contact point. The floatation mechanism fastener is positioned adjacent to, on, or through at least the first or second contact points aligning contact between the floatation mechanism mount and the first floatation adjustment array in a first operable mode.

In some embodiments, the mower includes a second floatation adjustment array. The first floatation adjustment array is mechanically linked to the trail frame and the second floatation adjustment array is mechanically linked to the header.

In some embodiments, the first floatation adjustment array includes a plurality of contact points. The contact points are holes through which the floatation mechanism fastener is positioned defining an operable height of the first floatation adjustment array. The contact points are arranged in a circumferential, radial or substantially vertical path along a portion of the first floatation adjustment array.

In some embodiments, the floatation mechanism includes a tension component chosen from: a coil spring, a torsion spring, an air spring, and a hydraulic actuator.

In some embodiments, the header floatation system is adjustable in height in at least a first and a second operable mode. In the first operable mode, the floatation mechanism mount and the floatation adjustment array are positionally aligned and operably linked by the floatation mechanism fastener at the first contact point. In the second operable mode, the floatation mechanism mount and the floatation adjustment array are positionally aligned and operably linked by the floatation mechanism fastener at the third contact point.

In some embodiments, the header is movable to a third operable position at a height sufficient to release all of substantially all tension in the floatation mechanism.

In some embodiments, the first floatation adjustment array includes at least two contact points and the floatation mechanism mount is movable relative to the trail frame such that alignment of at least one contact point of the first floatation adjustment array and at least one contact point of the mount determines the length of the floatation mechanism.

In some embodiments, the header includes a skid shoe, a skid shoe mount, a skid shoe adjustment array, and a skid shoe fastener. The skid shoe mount includes at least a fourth contact point. The skid shoe adjustment array includes at least a fifth contact point. The skid shoe is mechanically linked to the cutter bar by at least one pivot point. The skid shoe mount is mechanically linked to the skid shoe. At least one of either the skid shoe adjustment array or the skid shoe mount is mechanically linked to the header. The skid shoe fastener is positioned adjacent to, on, or through at least the fourth or fifth contact points aligning contact between the skid shoe mount and the skid shoe array in a first operable skid shoe mode.

In some embodiments, the header includes a first lateral end, a second lateral end, a first set of floatation elements, and a second set of floatation elements. The second lateral end located opposite the first lateral end. The first set of floatation elements including the floatation mechanism, the first floatation adjustment array, and the floatation mechanism mount. The second set of floatation elements including a second floatation mechanism, a second floatation adjustment array, a second floatation mechanism fastener. The second floatation mechanism operably connected to the header at one end of the second floatation mechanism and operably connected to the trail frame at an opposite end of the second floatation mechanism. The second floatation mechanism includes at least a fourth contact point. The second floatation mechanism mount is mechanically linked to the trail frame and includes at least a fifth contact point. The second floatation mechanism is mechanically linked to the trail frame or header though an attachment to the second floatation mechanism mount. The second floatation adjustment array is mechanically linked to the trail frame or the header. Either the second floatation adjustment array or the second floatation mechanism mount includes at least a sixth contact point. The second floatation mechanism fastener is positioned adjacent to, on, or through at least the fourth or fifth contact points aligning contact between the second floatation mount and the second floatation adjustment array in a second operational mode. The first set of floatation elements is generally aligned vertically or substantially vertically with the first lateral end of the header. The second set of floatation elements is generally aligned vertically or substantially vertically with the second lateral end of the header.

Another aspect of the present disclosure is a method of adjusting a mower. The method includes a header floatation system. The header floatation system includes a trail frame, a header including a cutter bar generally located on the underside of the header, a floatation mechanism, a first floatation adjustment array, a floatation mechanism mount, and a floatation mechanism fastener. The floatation mechanism is operably connected to the header at one end of the floatation mechanism and operably connected to the trail frame at an opposite end of the floatation mechanism. The first floatation adjustment array includes at least a first contact point. The floatation mechanism mount is connected to the trail frame or the header and includes at least a second contact point. The trail frame and the header are mechanically linked by at least one pivot point. The floatation mechanism is mechanically linked to the trail frame or the header through an attachment to the floatation mechanism mount. The first floatation adjustment array is mechanically linked to the trail frame of the cutter bar. Either the first floatation adjustment array or the floatation mechanism mount include at least a third contact point. The method further includes moving the position of the floatation mechanism fastener from the first contact point to the third contact point along the path of the floatation mechanism adjustment array to position the floatation mechanism to a desired height.

In some embodiments, the header includes a skid shoe, a skid shoe mount, a skid shoe adjustment array, and a skid shoe fastener. The skid shoe mount includes at least a fourth contact point. The skid shoe adjustment array includes at least a fifth contact point. The skid shoe is mechanically linked to the cutter bar by at least one pivot point. The skid shoe mount is mechanically linked to the skid shoe. Either the skid shoe mount or the skid shoe adjustment array includes a sixth contact point. At least one of either the skid shoe adjustment array or the skid shoe mount is mechanically linked to the trail frame. The method further includes moving the position of the skid shoe fastener from the fourth contact point to the sixth contact point of the skid shoe adjustment array to position the cutter bar to a desired height.

BRIEF DESCRIPTION OF THE DRAWINGS

To assist those of skill in the art in making and using the disclosed header and associated system and methods, reference is made to the accompanying figures, wherein:

FIG. 3A is a perspective view of an exemplary floatation adjustment array mechanically linked to the header while set to a high cut operational mode.

FIG. 3B is a perspective view of an exemplary floatation adjustment array mechanically linked to the header while set to a low cut operational mode.

FIG. 8A is a side view of an exemplary floatation adjustment array which is operably connected to the top end of a floatation mechanism and an exemplary skid shoe adjustment array while both adjustment arrays are set to high cut operational modes.

FIG. 8B is a side view of an exemplary floatation adjustment array which is operably connected to the top end of a floatation mechanism and an exemplary skid shoe adjustment array while both adjustment arrays are set to low cut operational modes.

FIG. 9A is a perspective view of two exemplary floatation adjustment arrays, one mechanically linked to the header and the other mechanically linked to the trail frame, while both are set to a high cut operational mode.

FIG. 9B is a perspective view of two exemplary floatation adjustment arrays, one mechanically linked to the header and the other mechanically linked to the trail frame, while both are set to a low cut operational mode.

DETAILED DESCRIPTION

Figure 1:
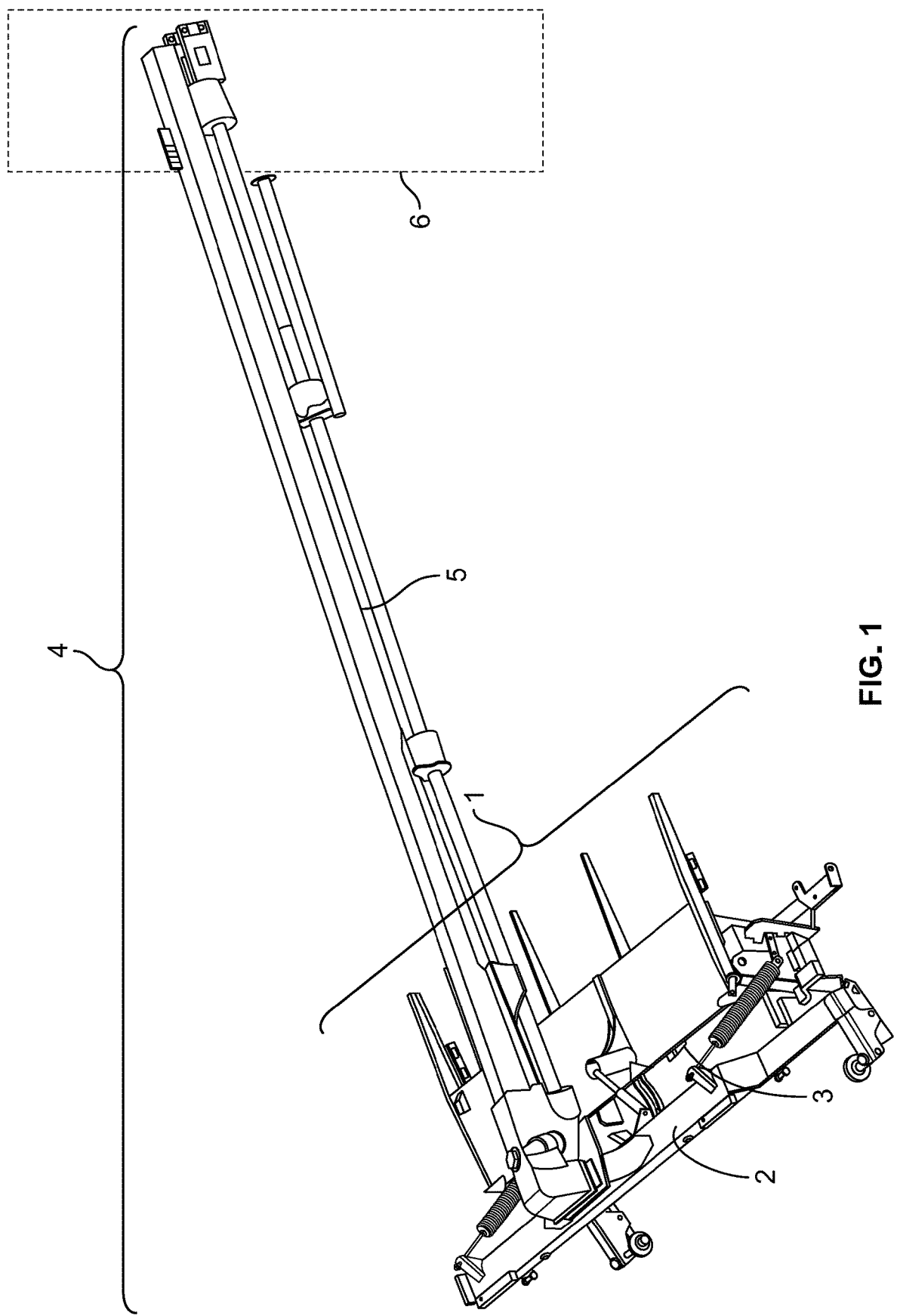
FIG. 1 is a perspective view of an exemplary mower of the present disclosure attached to a tractor.

Various terms relating to the methods and other aspects of the present disclosure are used throughout the specification and claims. Such terms are to be given their ordinary meaning in the art unless otherwise indicated. Other specifically defined terms are to be construed in a manner consistent with the definition provided herein.

As used in this specification and the appended claims, the singular forms "a," "an," and "the" include plural referents unless the content clearly dictates otherwise.

The term "more than 2" as used herein is defined as any whole integer greater than the number two, e.g., 3, 4, or 5.

The term "plurality" as used herein is defined as any amount or number greater or more than 1. In some embodiments, the term "plurality" means 2, 3, 4, 5, 6 or more.

The terms "left", "right", "top", or "bottom" are used herein as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes.

The term "about" or "approximately" as used herein when referring to a measurable value such as an amount, a temporal duration, and the like, is meant to encompass variations of ±20%, ±10%, ±5%, ±1%, ±0.5%, ±0.4%, ±0.3%, ±0.2%, ±0.1%, ±0.09%, ±0.08%, ±0.07%, ±0.06%, ±0.05%, ±0.04%, ±0.03%, ±0.02% or ±0.01% from the specified value, as such variations are appropriate to perform the disclosed methods.

The term "substantially equal" as used herein when referring to a measureable and/or adjustable value is meant to encompass a value equal to or approximately equal to a set value or range. For example, the value can be equal to or within ±5%, ±1%, ±0.5%, ±0.4%, ±0.3%, ±0.2%, ±0.1%, ±0.09%, ±0.08%, ±0.07%, ±0.06%, ±0.05%, ±0.04%, ±0.03%, ±0.02% or ±0.01% of a set desired value or an expected value.

The term "connect", "connects", "connected", or "connecting" as used herein is meant to encompass both direct connections and indirect connections.

The terms "operably connected" and "mechanically linked" as used herein are interchangeable and refer to both direct connections and indirect connections.

The terms "mount" and "apron" as used herein are not meant to be limited to any specific geometry. An apron may be used as a mount and a mount may be used as an apron.

The term "spring tension mount" as used herein may include any mount that may adjust the tension of a floatation mount, including but not limited to an eccentric mount such as a mount that may adjust tension in the floatation mechanism by being rotated.

The term "tractor" as used herein is a general term for vehicles that may be used in agricultural applications or to otherwise carry or be operably connected to equipment, including but not limited to harvesters.

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Furthermore, the various components shown or described herein for any specific application of this invention can be varied and the practice of a specific application of any element may already be widely known or used in the art by persons skilled in the art and each will likewise not therefore be discussed in significant detail.

FIG. 1 is a perspective view of a mower 4 attached to a tractor 6. The mower includes a header 1 and a tongue 5. The header 1 includes a cutter bar 3 and a trail frame 2. The tongue 5 extends forwardly from the trail frame 2 and connects the mower 4 to the tractor 6. In some embodiments, the tongue 5 can be pivotally connected to the trail frame 2. In some embodiments, the header 1 can be pivotally connected to the trail frame 2.

Figure 2:
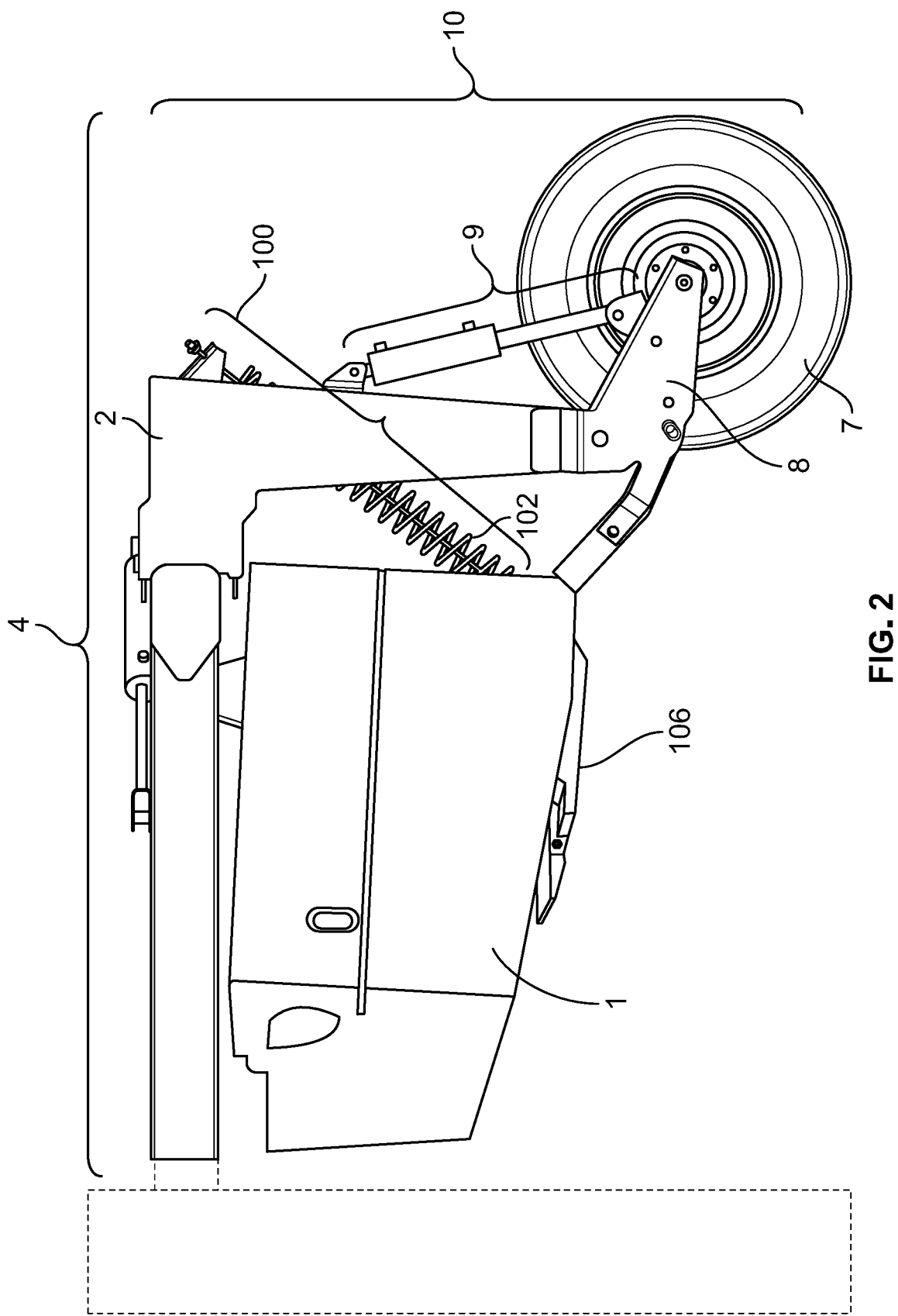
FIG. 2 is a side view of an exemplary mower including an exemplary floatation adjustment array.

FIG. 2 is a side view of the mower 4. The mower 4 includes a header floatation system 10. The header floatation system 10 includes a floatation mechanism 100. In some embodiments the floatation mechanism 100 can be a spring 102 of any type, such as, for example, a coil spring, a torsion spring, an air spring, or a hydraulic accumulator. In some embodiments, the header floatation system 10 can include a skid shoe 106. The skid shoe 106 is positioned on the bottom of the cutter bar 3. The distance between the header 1 and the ground is the ground height or cut height. Due to the cutter bar 3 being located on the underside of the header 1, the distance between the cutter bar 3 and the ground is also referred to as ground height or cut height.

In some embodiments, the mower 4 can include a wheel 7. In some embodiments, the wheel 7 can be connected to the trail frame 2 by a wheel mount 8. In some embodiments the wheel mount 8 can be pivotally connected to the trail frame 2. In some embodiments, a suspension cylinder 9 may be connected to the trail frame 2 at one end, such as its top end, and the wheel mount 7 at a second end, such as its bottom end.

FIG. 3A and FIG. 3B are perspective views of a header floatation system 10 while set to a high cut operational mode and a low cut operational mode, respectively. The header floatation system 10 includes a floatation mechanism 100, a floatation mechanism adjustment array 104 which is mechanically linked to the header 1, a floatation mechanism mount 103 which is mechanically linked to the bottom of the floatation mechanism 100, and a floatation mechanism fastener 105. In some embodiments, the header floatation system 10 can include an apron 112. In some embodiments, the header floatation system 10 can include a spring tension mount 110. In some embodiments the header floatation system 10 can include a skid shoe 106, a skid shoe adjustment array 107, a skid shoe mount 108, and a skid shoe fastener 109.

The floatation mechanism 100 includes a first end and a second end opposite the first end. The floatation mechanism mount 103 is mechanically linked to one of the ends of the floatation mechanism 100. The floatation mechanism mount 103 includes at least a contact point 111. In some embodiments, the floatation mechanism mount 103 can include a plurality of contact points 111. In some embodiments, the floatation mechanism mount 103 can be pivotally connected to the floatation mechanism adjustment array 104. In some embodiments, the floatation mechanism mount 103 can be pivotally connected to the header 1. The floatation mechanism adjustment array 104 includes at least a contact point 111. In some embodiments, the floatation mechanism adjustment array 104 can include a plurality of contact points 111.

In some embodiments, the contact points 111 can be holes. In some embodiments, the floatation mechanism fastener 105 can be a pin. The floatation mechanism fastener 105 aligns contact between the floatation mechanism mount 103 and the floatation mechanism adjustment array 104 at the respective contact points 111. In some embodiments, the floatation mechanism fastener 105 can align contact at the respective contact points 111 by being positioned adjacent to the contact points 111. In some embodiments, the floatation mechanism fastener 105 can align contact at the respective contact points 111 by being positioned on the contact points 111. In some embodiments, the floatation mechanism fastener 105 can align contact at the respective contact points 111 by being positioned through the contact points 111.

The floatation mechanism adjustment array 104 as shown in FIG. 3A and FIG. 3B includes a plurality of contact points 111 arranged in a path. The position of the contact points 111 are arranged so that aligning a contact point 111 on the floatation mechanism mount 103 with a contact point 111 on the floatation mechanism adjustment array 104 determines the length L of the floatation mechanism 100. The floatation mechanism length L impacts the floatation settings of the floatation mechanism 100. For example, the floatation mechanism length L can adjust the stretch of a spring 102. In some embodiments, the floatation mechanism adjustment array 104 can include between two and eight contact points 111. The floatation mechanism adjustment array 104 as shown in FIG. 3A and FIG. 3B includes two plates 113a and 113b. The contact points 111 on plate 113a correspond to the position of the contact points 111 on plate 113b. Floatation mechanism mount 103 is positioned between plate 113a and plate 113b.

The skid shoe adjustment array 107 as shown in FIG. 3A and FIG. 3B includes a plurality of contact points 111 arranged in a path. The position of the contact points 111 are arranged so that aligning a contact point 111 on the skid shoe mount 108 with a contact point 111 on the skid shoe adjustment array 107 determines the position of the skid shoe 106. The position of the skid shoe 106 impacts the ground height of the cutter bar 3. For example, when the skid shoe 106 is adjusted downward, the ground height of the cutter bar 3 is increased. In some embodiments, the skid shoe adjustment array 107 can include between two and eight contact points 111. In some embodiments, the skid shoe adjustment array 107 can include the same number of contact points 111 as the floatation mechanism adjustment array 104. In some embodiments, the skid shoe adjustment array 107 can include a different number of contact points 111 than the floatation mechanism adjustment array 104.

FIG. 3A shows the header floatation system 10 when it is set to a high cut operational mode. The floatation mechanism fastener 105 aligns the contact point 111 on the floatation mechanism mount 103 with the bottom contact point 111 on the floatation mechanism adjustment array 104. Such an alignment corresponds with a floatation mechanism length L that is desired when the cutter bar 3 is set to a ground height that is desirable for a high cut height. The skid shoe fastener 109 aligns the contact point 111 on the skid shoe mount 108 with the top contact point 111 on the skid shoe adjustment array 107. Such an alignment corresponds to a position of the skid shoe 106 that raises the cutter bar 3 to a ground height that is desirable for a high cut height.

FIG. 3B shows the header floatation system 10 when it is set to a low cut operational mode. The floatation mechanism fastener 105 aligns the contact point 111 on the floatation mechanism mount 103 with the top contact point 111 on the floatation mechanism adjustment array 104. Such an alignment corresponds with a floatation mechanism length L that is desired when the cutter bar 3 is set to a ground height that is desirable for a low cut height. The skid shoe fastener 109 aligns the contact point 111 on the skid shoe mount 108 with the bottom contact point 111 on the skid shoe adjustment array 107. Such an alignment corresponds to a position of the skid shoe 106 that raises the cutter bar 3 to a ground height that is desirable for a low cut height.

Figure 4:
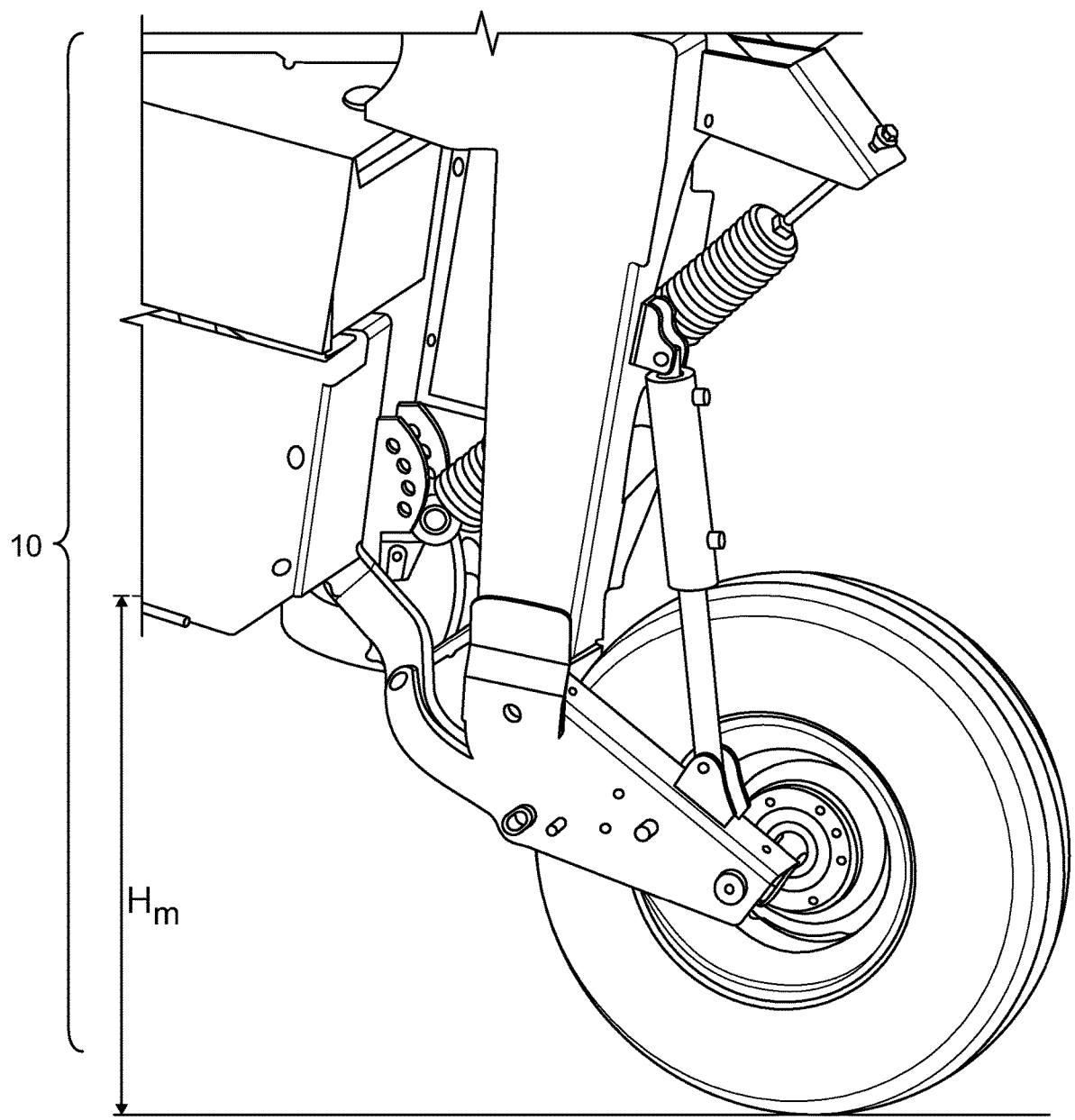
FIG. 4 is a perspective view of an exemplary floatation adjustment array mechanically linked to the header while the header is being lifted to at least approximately 90% of a maximum ground height.

FIG. 4 shows a perspective view of the header floatation system 10 shown in FIG. 3A and FIG. 3B while the header 1 is being lifted to at least approximately 90% of a maximum ground height Hm. While the header 1 is being lifted in such a way, the floatation mechanism length L is such that the floatation mechanism 100 is free or substantially free of tension. This allows an operator to manually adjust the floatation mechanism fastener 105 to align the contact points 111 of the floatation mechanism adjustment array 104 and the floatation mechanism mount 103 in such a way to achieve a floatation mechanism length L that corresponds with the operator's desired ground height of the cutter bar 3.

Figure 5B:
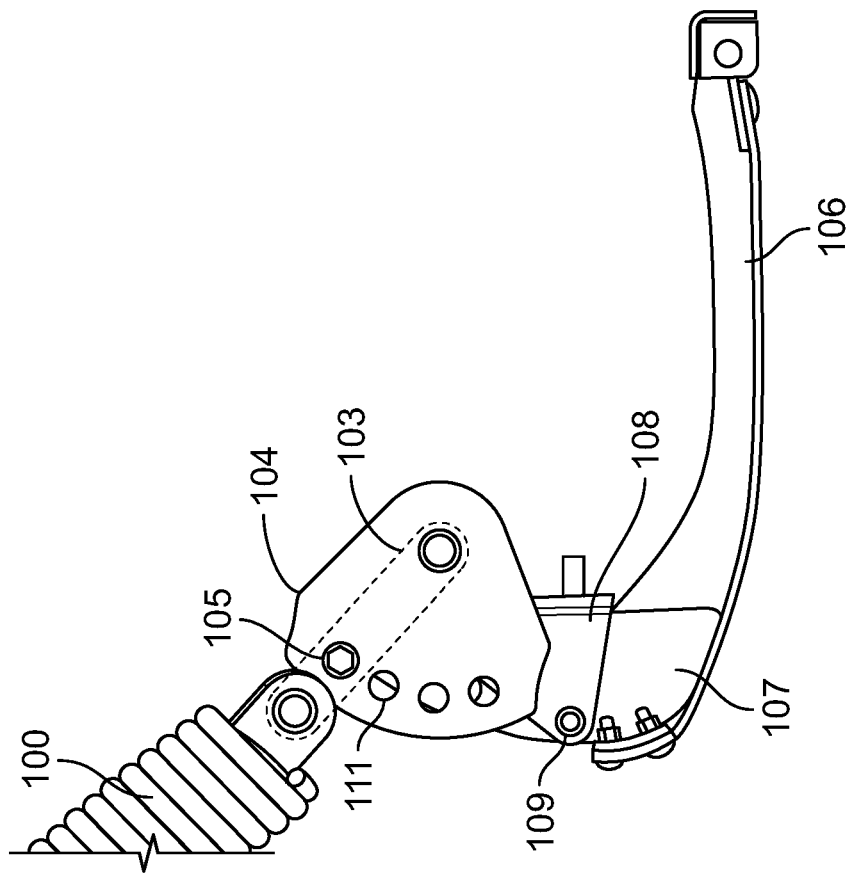
FIG. 5B is a side view of an exemplary floatation adjustment array which is operably connected to the bottom end of a floatation mechanism and an exemplary skid shoe adjustment array while both adjustment arrays are set to low cut operational modes.
Figure 5A:
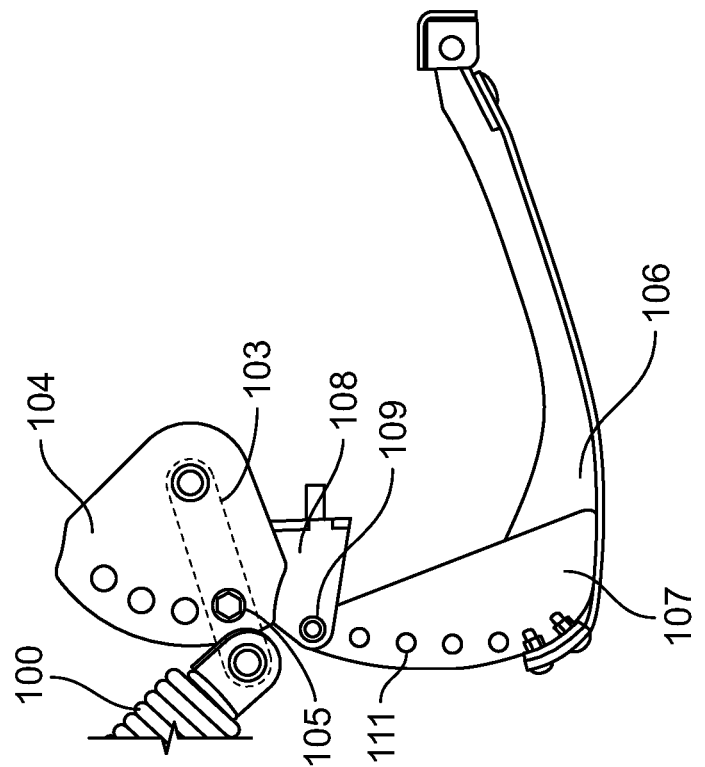
FIG. 5A is a side view of an exemplary floatation adjustment array which is operably connected to the bottom end of a floatation mechanism and an exemplary skid shoe adjustment array while both adjustment arrays are set to high cut operational modes.

FIG. 5A and FIG. 5B show a close-up view of the portions of the header floatation system 10 surrounding the floatation mechanism adjustment array 104 and the skid shoe adjustment array 107 of FIG. 3A and FIG. 3B, respectively.

Figure 6B:
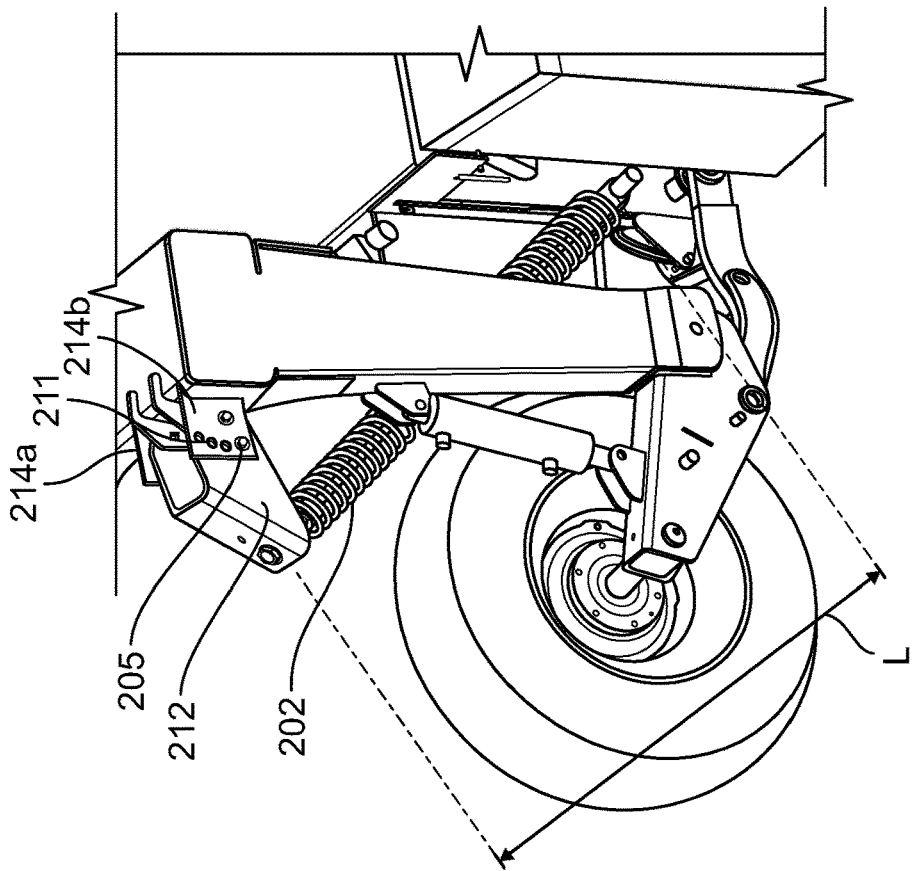
FIG. 6B is a perspective view of an exemplary floatation adjustment array mechanically linked to the trail frame while set to a low cut operational mode
Figure 6A:
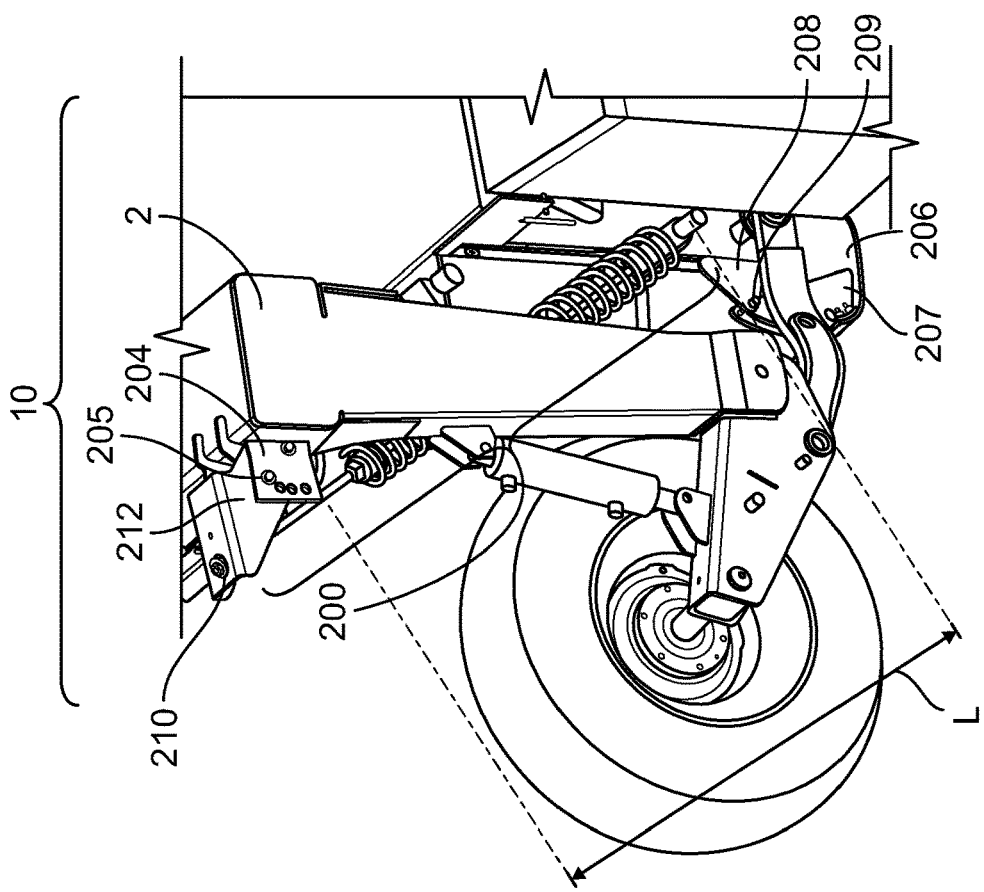
FIG. 6A is a perspective view of an exemplary floatation adjustment array mechanically linked to the trail frame while set to a high cut operational mode.

FIG. 6A and FIG. 6B are perspective views of a header floatation system 10 while set to a high cut operational mode and a low cut operational mode, respectively. The header floatation system 10 includes a floatation mechanism 200, a floatation mechanism adjustment array 204 which is mechanically linked to the trail frame 2, an apron 212 which is operably connected to the top of the floatation mechanism 200, and a floatation mechanism fastener 205. In some embodiments, the header floatation system 10 can include a spring tension mount 210. In some embodiments the header floatation system 10 can include a skid shoe 206, a skid shoe adjustment array 207, a skid shoe mount 208, and a skid shoe fastener 209.

The floatation mechanism 200 includes a first end and a second end opposite the first end. The apron 212 is connected to the top end of the floatation mechanism 200. The apron 212 includes at least a contact point 211. In some embodiments, the apron 212 can include a plurality of contact points 211. In some embodiments, the apron 212 can be pivotally connected to the floatation mechanism adjustment array 204. In some embodiments, the apron 212 can be pivotally connected to the trail frame 2. The floatation mechanism adjustment array 204 includes at least a contact point 211. In some embodiments, the floatation mechanism adjustment array 204 can include a plurality of contact points 211. In some embodiments, the contact points 211 can be holes. In some embodiments, the floatation mechanism fastener 205 can be a pin. The floatation mechanism fastener 205 aligns contact between the apron 212 and the floatation mechanism adjustment array 204 at the respective contact points 211. In some embodiments, the floatation mechanism fastener 205 can align contact at the respective contact points 211 by being positioned adjacent to the contact points 211. In some embodiments, the floatation mechanism fastener 205 can align contact at the respective contact points 211 by being positioned on the contact points 211. In some embodiments, the floatation mechanism fastener 205 can align contact at the respective contact points 211 by being positioned through the contact points 211.

The floatation mechanism adjustment array 204 as shown in FIG. 6A and FIG. 6B includes a plurality of contact points 211 arranged in a path. The position of the contact points 211 are arranged so that aligning a contact point 211 on the apron 212 with a contact point 211 on the floatation mechanism adjustment array 204 determines the length L of the floatation mechanism 200. The floatation mechanism length L impacts the floatation settings of the floatation mechanism 200. For example, the floatation mechanism length L can adjust the stretch of a spring 202. In some embodiments, the floatation mechanism adjustment array 204 can include between two and eight contact points 211. The floatation mechanism adjustment array 204 as shown in FIG. 6A and FIG. 6B includes two plates 214a and 214b. The contact points 211 on plate 214a correspond to the position of the contact points 211 on plate 214b. Apron 212 is positioned between plate 214a and plate 214b.

The skid shoe adjustment array 207 as shown in FIG. 6A and FIG. 6B includes a plurality of contact points 211 arranged in a path. The position of the contact points 211 are arranged so that aligning a contact point 211 on the skid shoe mount 208 with a contact point 211 on the skid shoe adjustment array 207 determines the position of the skid shoe 206. The position of the skid shoe 206 impacts the ground height of the cutter bar 3. For example, when the skid shoe 206 is adjusted downward, the ground height of the cutter bar 3 is increased. In some embodiments, the skid shoe adjustment array 204 can include between two and eight contact points 211. In some embodiments, the skid shoe adjustment array 207 can include the same number of contact points 211 as the floatation mechanism adjustment array 204. In some embodiments, the skid shoe adjustment array 207 can include a different number of contact points 211 than the floatation mechanism adjustment array 204.

FIG. 6A shows the header floatation system 10 when it is set to a high cut operational mode. The floatation mechanism fastener 205 aligns the contact point 211 on the apron 212 with the top contact point 211 on the floatation mechanism adjustment array 204. Such an alignment corresponds with a floatation mechanism length L that is desired when the cutter bar 3 is set to a ground height that is desirable for a high cut height. The skid shoe fastener 209 aligns the contact point 211 on the skid shoe mount 208 with the top contact point 211 on the skid shoe adjustment array 207. Such an alignment corresponds to a position of the skid shoe 206 that raises the cutter bar 3 to a ground height that is desirable for a high cut height.

FIG. 6B shows the header floatation system 10 when it is set to a low cut operational mode. The floatation mechanism fastener 205 aligns the contact point 211 on the apron 212 with the bottom contact point 211 on the floatation mechanism adjustment array 204. Such an alignment corresponds with a floatation mechanism length L that is desired when the cutter bar 3 is set to a ground height that is desirable for a low cut height. The skid shoe fastener 209 aligns the contact point 211 on the skid shoe mount 208 with the bottom contact point 211 on the skid shoe adjustment array 207. Such an alignment corresponds to a position of the skid shoe 206 that raises the cutter bar 3 to a ground height that is desirable for a low cut height.

Figure 7:
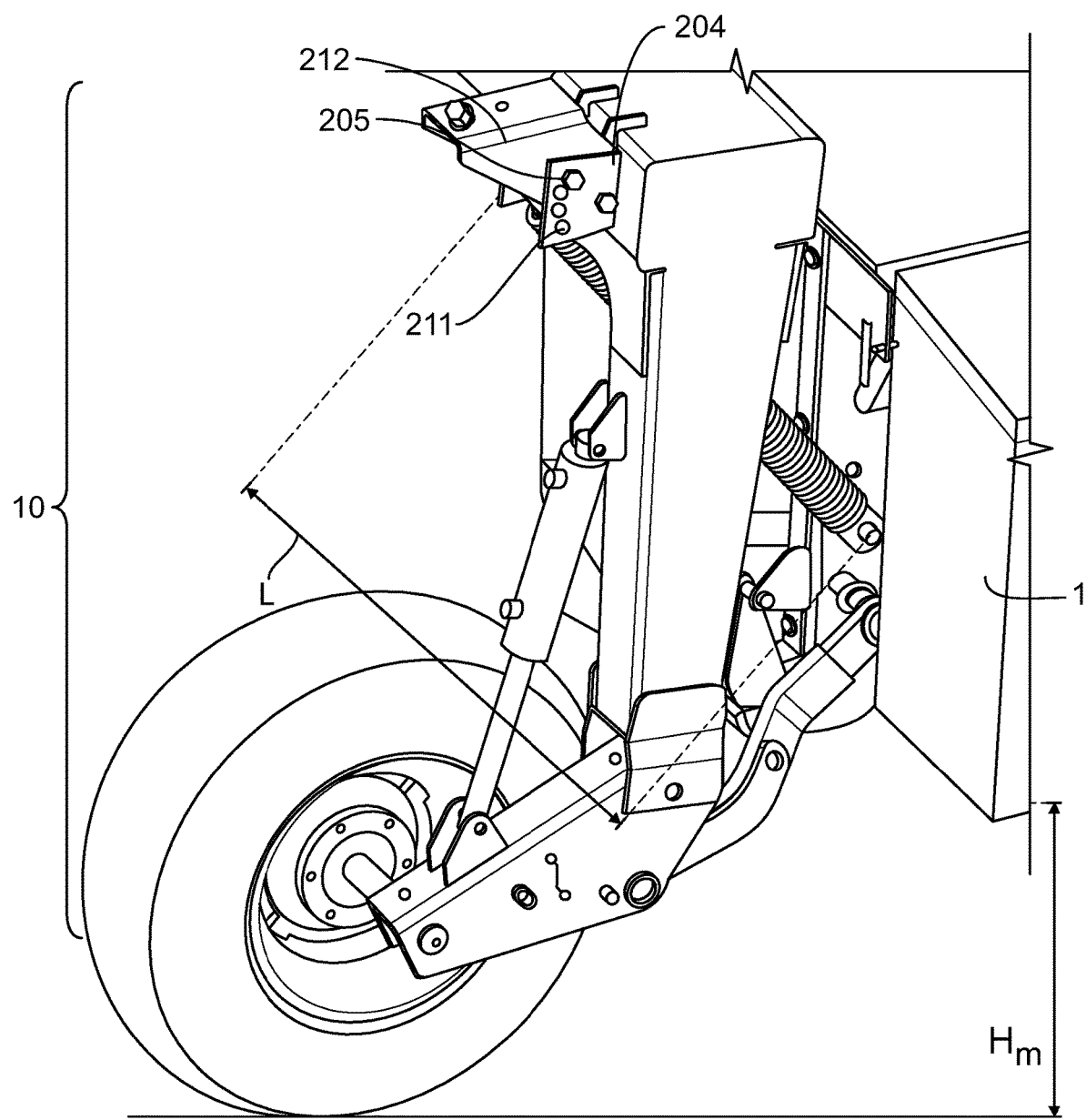
FIG. 7 is a perspective view of an exemplary floatation adjustment array mechanically linked to the trail frame while the header is being lifted to at least approximately 90% of a maximum ground height.

FIG. 7 shows a perspective view of the header floatation system 10 shown in FIG. 6A and FIG. 6B while the header 1 is being lifted to at least approximately 90% of a maximum ground height Hm. While the header 1 is being lifted in such a way, the floatation mechanism length L is such that the floatation mechanism 200 is free or substantially free of tension. This allows an operator to manually adjust the floatation mechanism fastener 205 to align the contact points 211 of the floatation mechanism adjustment array 204 and the apron 212 in such a way to achieve a floatation mechanism length L that corresponds with the operator's desired ground height of the cutter bar 3.

FIG. 8A and FIG. 8B show a close-up view of the portions of the header floatation system 10 surrounding the floatation mechanism adjustment array 204 and the skid shoe adjustment array 207 of FIG. 6A and FIG. 6B, respectively.

FIG. 9A and FIG. 9B are perspective views of a header floatation system 10 while set to a high cut operational mode and a low cut operational mode, respectively. The header floatation system 10 includes a floatation mechanism 300, a first floatation mechanism adjustment array 304a which is mechanically linked to the header 1, a floatation mechanism mount 303 which is mechanically linked to the bottom of the floatation mechanism 300, a second floatation mechanism adjustment array 304b which is mechanically linked to the trail frame 2, an apron 312 which is mechanically linked to the top of the floatation mechanism 300, and at least two floatation mechanism fasteners 305. In some embodiments, the header floatation system 10 can include a spring tension mount 310. In some embodiments the header floatation system 10 can include a skid shoe 306, a skid shoe adjustment array 307, a skid shoe mount 308, and a skid shoe fastener 309.

The floatation mechanism 300 includes a first end and a second end opposite the first end. The floatation mechanism mount 303 is connected to the bottom end of the floatation mechanism 300. The floatation mechanism mount 303 includes at least a contact point 311. In some embodiments, the floatation mechanism mount 303 can include a plurality of contact points 311. In some embodiments, the floatation mechanism mount 303 can be pivotally connected to the first floatation mechanism adjustment array 304a. In some embodiments, the floatation mechanism mount 303 can be pivotally connected to the header 1. The first floatation mechanism adjustment array 304a includes at least a contact point 311. In some embodiments, the first floatation mechanism adjustment array 304a can include a plurality of contact points 311.

The apron 312 is connected to the top end of the floatation mechanism 300. The apron 312 includes at least a contact point 311. In some embodiments, the apron 312 can include a plurality of contact points 311. In some embodiments, the apron 312 can be pivotally connected to the second floatation mechanism adjustment array 304b. In some embodiments, the apron 312 can be pivotally connected to the trail frame 2. The second floatation mechanism adjustment array 304b includes at least a contact point 311. In some embodiments, the second floatation mechanism adjustment array 304b can include a plurality of contact points 311.

In some embodiments, the contact points 311 can be holes. In some embodiments, the floatation mechanism fasteners 305 can be pins. The first floatation mechanism fastener 305 aligns contact between the floatation mechanism mount 303 and the first floatation mechanism adjustment array 304 at the respective contact points 311.

In some embodiments, the floatation mechanism fasteners 305 can align contact at the respective contact points 311 by being positioned adjacent to the contact points 311. In some embodiments, the floatation mechanism fasteners 305 can align contact at the respective contact points 311 by being positioned on the contact points 311. In some embodiments, the floatation mechanism fasteners 305 can align contact at the respective contact points 311 by being positioned through the contact points 311.

Both the first and the second floatation mechanism adjustment array 304a and 304b as shown in FIG. 9A and FIG. 9B includes a plurality of contact points 311 arranged in a path.

The position of the contact points 311 are arranged so that aligning a contact point 311 on the floatation mechanism mount 303 with a contact point 311 on the first floatation mechanism adjustment array 304a or aligning a contact point 311 on the apron 312 with a contact point 311 on the second floatation mechanism adjustment array 304b determines the length L of the floatation mechanism 300. The floatation mechanism length L impacts the floatation settings of the floatation mechanism 300. For example, the floatation mechanism length L can adjust the stretch of a spring 302. In some embodiments, the first floatation mechanism adjustment array 304a can include between two and eight contact points 311. In some embodiments, the second floatation mechanism adjustment array 304b can include between two and eight contact points 311. In some embodiments, the number of contact points on the first floatation mechanism adjustment array 304a can be the same as the number of contact points on the second floatation mechanism adjustment array 304b. In some embodiments, the number of contact points on the first floatation mechanism adjustment array 304a can be different than the number of contact points on the second floatation mechanism adjustment array 304b.

The first floatation mechanism adjustment array 304a as shown in FIG. 9A and FIG. 9B includes two plates 313a and 313b. The contact points 311 on plate 313a correspond to the position of the contact points 311 on plate 313b. The floatation mechanism mount 303 is positioned between plate 313a and plate 313b. The second floatation mechanism adjustment array 304b as shown in FIG. 9A and FIG. 9B includes two plates 314a and 314b. The contact points 311 on plate 314a correspond to the position of the contact points 311 on plate 314b. The apron 312 is positioned between plate 314a and plate 314b.

The skid shoe adjustment array 307 as shown in FIG. 9A and FIG. 9B includes a plurality of contact points 311 arranged in a path. The position of the contact points 311 are arranged so that aligning a contact point 311 on the skid shoe mount 308 with a contact point 311 on the skid shoe adjustment array 307 determines the position of the skid shoe 306. The position of the skid shoe 306 impacts the ground height of the cutter bar 3. For example, when the skid shoe 306 is adjusted downward, the ground height of the cutter bar 3 is increased. In some embodiments, the skid shoe adjustment array 307 can include between two and eight contact points 311. In some embodiments, the skid shoe adjustment array 307 can include the same number of contact points 311 as the first floatation mechanism adjustment array 304a. In some embodiments, the skid shoe adjustment array 307 can include the same number of contact points 311 as the second floatation mechanism adjustment array 304b. In some embodiments, the skid shoe adjustment array 307 can include a different number of contact points 311 than the first floatation mechanism adjustment array 304a or the second floatation mechanism adjustment array 304b.

FIG. 9A shows the header floatation system 10 when it is set to a high cut operational mode. The first floatation mechanism fastener 305 aligns the contact point 311 on the floatation mechanism mount 303 with the bottom contact point 311 on the first floatation mechanism adjustment array 304a. The second floatation mechanism fastener 305 aligns the contact point 311 on the apron 312 with the top contact point 311 on the second floatation mechanism adjustment array 304b. Such an alignment corresponds with a floatation mechanism length L that is desired when the cutter bar 3 is set to a ground height that is desirable for a high cut height. The skid shoe fastener 309 aligns the contact point 311 on the skid shoe mount 308 with the top contact point 311 on the skid shoe adjustment array 307. Such an alignment corresponds to a position of the skid shoe 306 that raises the cutter bar 3 to a ground height that is desirable for a high cut height.

FIG. 9B shows the header floatation system 10 when it is set to a low cut operational mode. The first floatation mechanism fastener 305 aligns the contact point 311 on the floatation mechanism mount 303 with the top contact point 311 on the first floatation mechanism adjustment array 304a. The second floatation mechanism fastener 305 aligns the contact point 311 on the apron 312 with the top contact point 311 on the second floatation mechanism adjustment array 304b. Such an alignment corresponds with a floatation mechanism length L that is desired when the cutter bar 3 is set to a ground height that is desirable for a low cut height. The skid shoe fastener 309 aligns the contact point 311 on the skid shoe mount 308 with the bottom contact point 311 on the skid shoe adjustment array 307. Such an alignment corresponds to a position of the skid shoe 306 that raises the cutter bar 3 to a ground height that is desirable for a low cut height.

Figure 10:
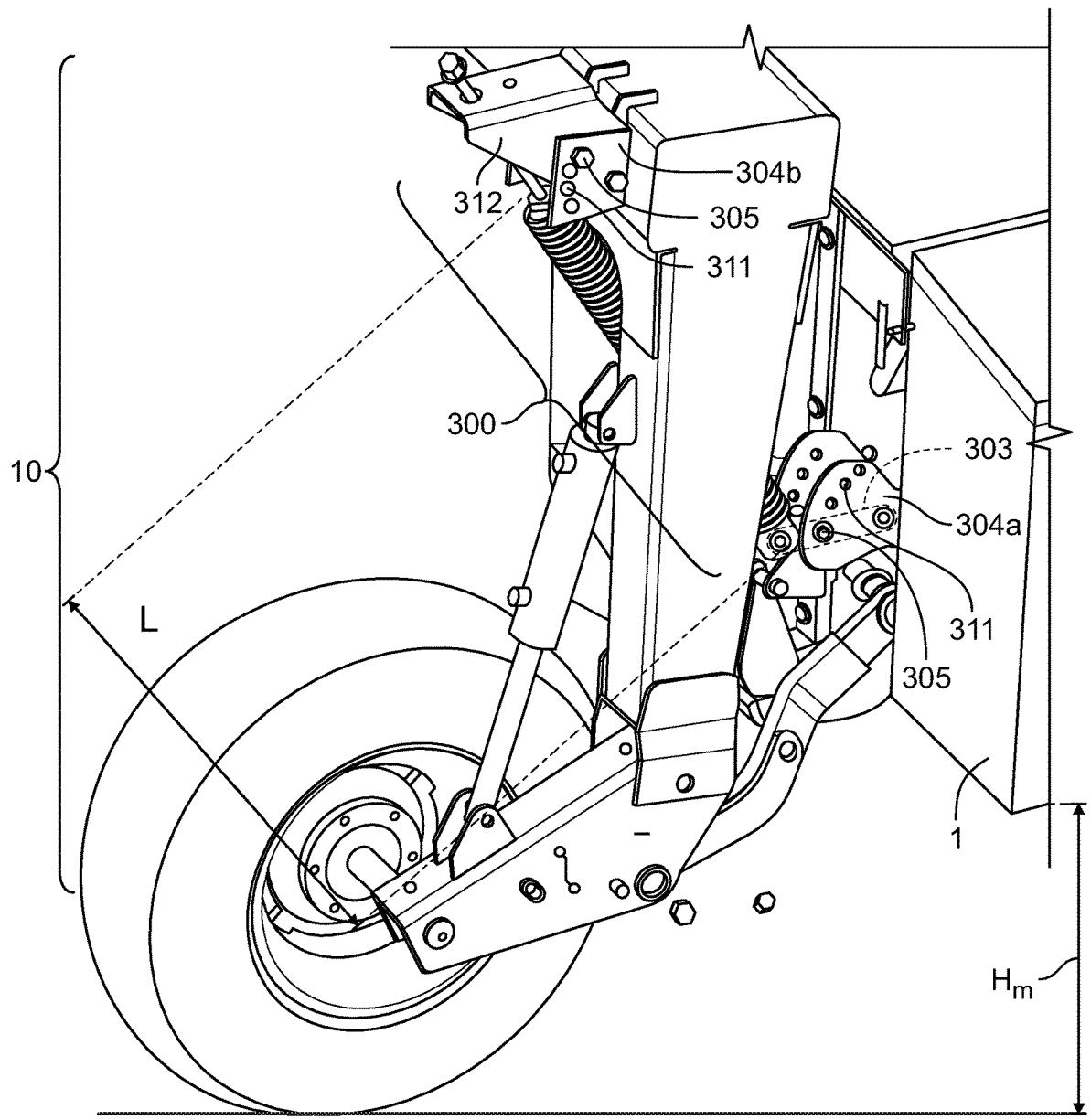
FIG. 10 is a perspective view of two exemplary floatation adjustment arrays, one mechanically linked to the header and the other mechanically linked to the trail frame, while the header is being lifted to at least approximately 90% of a maximum ground height.

FIG. 10 shows a perspective view of the header floatation system 10 shown in FIG. 9A and FIG. 9B while the header 1 is being lifted to at least approximately 90% of a maximum ground height Hm. While the header 1 is being lifted in such a way, the floatation mechanism length L is such that the floatation mechanism 300 is free or substantially free of tension. This allows an operator to manually adjust the first floatation mechanism fastener 305 to align the contact points 311 of the first floatation mechanism adjustment array 304a and the floatation mechanism mount 303 and to manually adjust the floatation mechanism fastener 305 to align the contact points 311 of the second floatation mechanism adjustment array 304b and the apron 312 in such a way to achieve a floatation mechanism length L that corresponds with the operator's desired ground height of the cutter bar 3.

Figure 11:
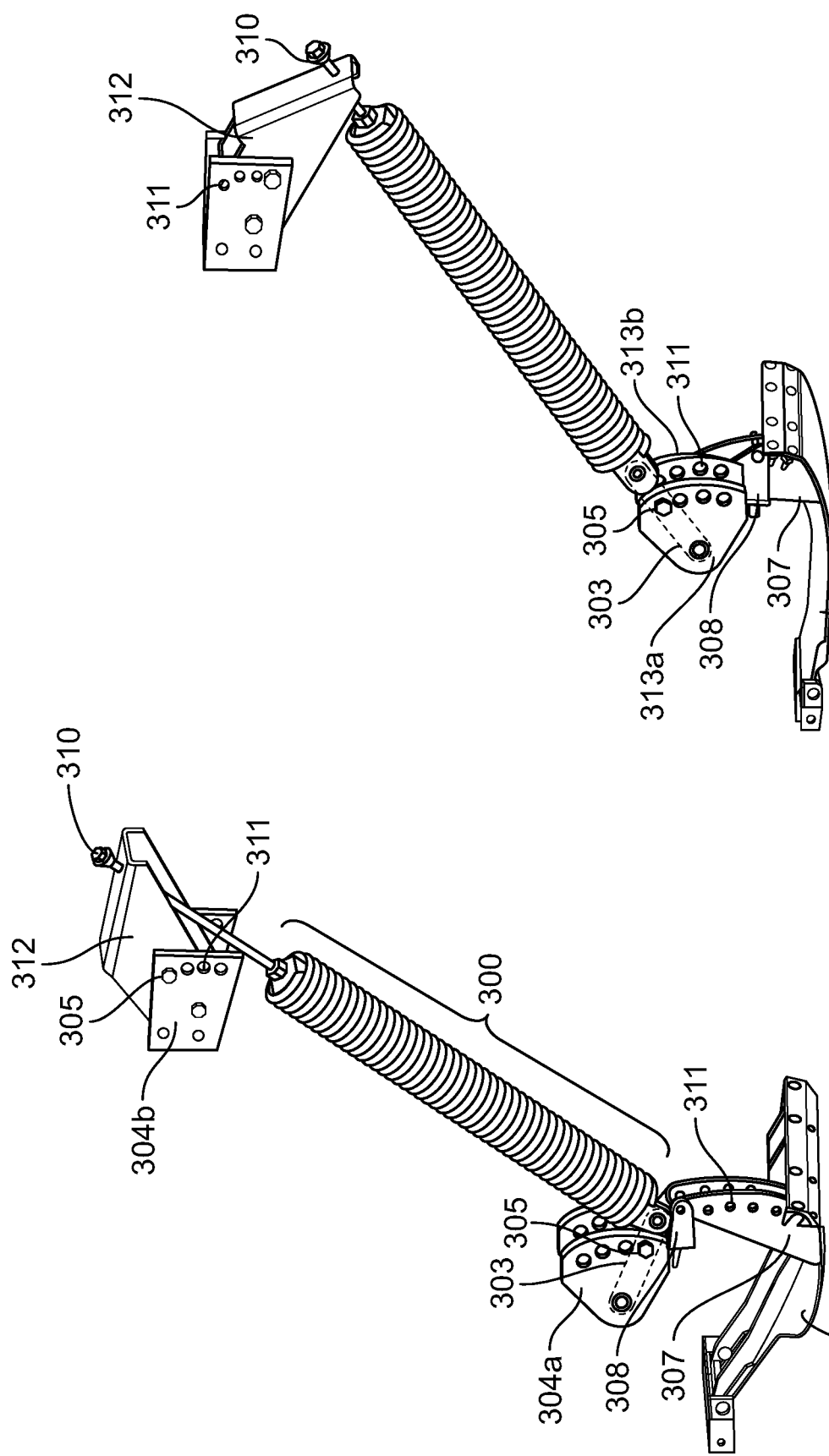
FIG. 11A is a side view of two exemplary floatation adjustment arrays, one mechanically linked to the top end of the floatation mechanism and the other mechanically linked to the bottom end of the floatation mechanism, while both adjustment arrays are set to high cut operational modes.
FIG. 11B is a side view of two exemplary floatation adjustment arrays, one mechanically linked to the top end of the floatation mechanism and the other mechanically linked to the bottom end of the floatation mechanism, while both adjustment arrays are set to low cut operational modes.

FIG. 11A and FIG. 11B show a close-up view of the portions of the header floatation system 10 surrounding the first and the second floatation mechanism adjustment arrays 304a and 304b and the skid shoe adjustment array 307 of FIG. 9A and FIG. 9B, respectively.

While exemplary embodiments have been described herein, it is expressly noted that these embodiments should not be construed as limiting, but rather that additions and modifications to what is expressly described herein also are included within the scope of the present disclosure. Moreover, it is to be understood that the features of the various embodiments described herein are not mutually exclusive and can exist in various combinations and permutations, even if such combinations or permutations are not made express herein, without departing from the spirit and scope of the present disclosure.

What is claimed is:

1. A header floatation system, comprising:
 a floatation mechanism comprising a first end and a second end opposite the first end;
 a first floatation adjustment array comprising at least a first contact point;
 a floatation mechanism mount comprising at least a second contact point;
 a floatation mechanism fastener;
  wherein the first end of the floatation mechanism is mechanically linked to the floatation mechanism mount;
  wherein either the first floatation adjustment array or the floatation mechanism mount comprises a third contact point;
  wherein the floatation mechanism fastener is positioned adjacent to, on, or through at least the first or second contact points aligning contact between the floatation mechanism mount and the first floatation adjustment array in a first operable mode;
 a second floatation adjustment array; and
 an apron connected to the second end of the floatation mechanism, the apron being pivotally connected to the second floatation adjustment array;
  wherein the first floatation adjustment array is mechanically linked to the first end of the floatation mechanism;
  wherein the second floatation adjustment array is mechanically linked to the second end of the floatation mechanism by way of the apron; and
  wherein the floatation mechanism comprises a tension component chosen from: a coil spring, a torsion spring, and an air spring.

2. The header floatation system of claim 1,
 wherein the first floatation adjustment array comprises a plurality of contact points;
 wherein the contact points are holes through which the floatation mechanism fastener is positioned defining an operable height of the first floatation adjustment array; and
 wherein the contact points are arranged in a circumferential, radial or substantially vertical path along a portion of the first floatation adjustment array.

3. The header floatation system of claim 1,
 wherein the header floatation system is adjustable in height in at least a first and a second operable mode;
 wherein in the first operable mode, the floatation mechanism mount and the floatation adjustment array are positionally aligned and operably linked by the floatation mechanism fastener at the first contact point; and
 wherein in the second operable mode, the floatation mechanism mount and the floatation adjustment array are positionally aligned and operably linked by the floatation mechanism fastener at the third contact point.

4. The header floatation system of claim 1, wherein the floatation mechanism is movable to a third operable position at a height sufficient to release all or substantially all tension in the floatation mechanism.

5. The header floatation system of claim 1,
 wherein the first floatation adjustment array comprises at least two contact points; and
 wherein the floatation mechanism mount is movable relative to the first floatation adjustment array such that alignment of at least one contact point of the first floatation adjustment array and at least one contact point of the mount determines a length of the floatation mechanism.

6. The header floatation system of claim 1,
 wherein the first floatation adjustment array comprises a first and second opposite facing protrusions defining a space therebetween, each of the first and second protrusions comprising a plurality of contact points arranged in a circumferential, radial or substantially vertical path adjacent to a leading edge of the first and second protrusions;
 wherein at least a first set of contact points on the first protrusion are paired and aligned on a substantially horizontal axis with a first set of contact points on the second protrusion at a first height;

wherein at least a second set of contact points on the first protrusion are paired and aligned on a substantially horizontal axis with a second set of contact points on the second protrusion at a second height;
wherein the floatation mechanism mount is positioned in the space between the first and second protrusions, fixed at a pair of contact points on the first and second protrusions by the fastener, and movable between at least the first and second heights at the first and second set of contact points; and
wherein the contact points are holes through which the fastener is positioned to define an operable position.

7. The header floatation system of claim 1, further comprising an eccentric mount operably connected to at least either the first or the second end of the floatation mechanism and movable to a plurality of positioned such that moving the eccentric mount from one position to another position adjusts the tension in the floatation mechanism.

8. A mower, comprising:
a tongue; and
a header floatation system;
wherein the header comprises:
a trail frame;
a header comprising a cutter bar located generally on the underside of the header;
a floatation mechanism operably connected to the header at one end of the floatation mechanism and operably connected to the trail frame at an opposite end of the floatation mechanism;
a first floatation adjustment array comprising at least a first contact point;
a floatation mechanism mount mechanically linked to the trail frame or the header and comprising at least a second contact point; and
a floatation mechanism fastener;
wherein the trail frame and the header are mechanically linked by at least one pivot point;
wherein the floatation mechanism is mechanically linked to the trail frame or the header through an attachment to the floatation mechanism mount;
wherein the first floatation adjustment array is mechanically linked to the trail frame or the header;
wherein either the first floatation adjustment array or the floatation mechanism mount comprises at least a third contact point;
wherein the floatation mechanism fastener is positioned adjacent to, on, or through at least the first or second contact points aligning contact between the floatation mechanism mount and the first floatation adjustment array in a first operable mode;
a second floatation adjustment array; and
an apron connected to the second end of the floatation mechanism, the apron being pivotally connected to the second floatation adjustment array;
wherein the first floatation adjustment array is mechanically linked to the first end of the floatation mechanism;
wherein the second floatation adjustment array is mechanically linked to the second end of the floatation mechanism; and
wherein the floatation mechanism comprises a tension component chosen from: a coil spring, a torsion spring, and an air spring.

9. The mower of claim 8,
wherein the first floatation adjustment array comprises a plurality of contact points;
wherein the contact points are holes through which the floatation mechanism fastener is positioned defining an operable height of the first floatation adjustment array; and
wherein the contact points are arranged in a circumferential, radial or substantially vertical path along a portion of the first floatation adjustment array.

10. The mower of claim 8,
wherein the header is adjustable in height in at least a first and a second operable mode;
wherein in the first operable mode, the floatation mechanism mount and the floatation adjustment array are positionally aligned and operably linked by the floatation mechanism fastener at the first contact point; and
wherein in the second operable mode, the floatation mechanism mount and the floatation adjustment array are positionally aligned and operably linked by the floatation mechanism fastener at the third contact point.

11. The mower of claim 8, wherein the header is movable to a third operable position at a height sufficient to release all of substantially all tension in the floatation mechanism.

12. The mower of claim 8,
wherein the first floatation adjustment array comprises at least two contact points; and
wherein the floatation mechanism mount is movable relative to the trail frame such that alignment of at least one contact point of the first floatation adjustment array and at least one contact point of the mount determines the length of the floatation mechanism.

13. The mower of claim 8, wherein the header further comprises:
a skid shoe;
a skid shoe mount comprising at least a fourth contact point;
a skid shoe adjustment array comprising at least a fifth contact point; and
a skid shoe fastener;
wherein the skid shoe is mechanically linked to the cutter bar by at least one pivot point;
wherein the skid shoe adjustment array is mechanically linked to the skid shoe;
wherein the skid shoe mount is mechanically linked to the header; and
wherein the skid shoe fastener is positioned adjacent to, on, or through at least the fourth or fifth contact points aligning contact between the skid shoe mount and the skid shoe array in a first operable skid shoe mode.

14. The mower of claim 8, wherein the header further comprises:
a first lateral end;
a second lateral end opposite the first lateral end;
a first set of floatation elements comprising the floatation mechanism, the first floatation adjustment array, and the floatation mechanism mount; and
a second set of floatation elements comprising:
a second floatation mechanism operably connected to the header at one end of the second floatation mechanism and operably connected to the trail frame at an opposite end of the second floatation mechanism;
a second floatation adjustment array comprising at least a fourth contact point;
a second floatation mechanism mount mechanically linked to the trail frame and comprising at least a fifth contact point; and
a second floatation mechanism fastener;

wherein the second floatation mechanism is mechanically linked to the trail frame or the header through an attachment to the second floatation mechanism mount;

wherein the second floatation adjustment array is mechanically linked to the trail frame or the header;

wherein either the second floatation adjustment array or the second floatation mechanism mount comprises at least a sixth contact point; and wherein the second floatation mechanism fastener is positioned adjacent to, on, or through at least the fourth or fifth contact points aligning contact between the second floatation mechanism mount and the second floatation adjustment array in a second operational mode;

wherein the first set of floatation elements is generally aligned vertically or substantially vertically with the first lateral end of the header; and wherein the second set of floatation elements is generally aligned vertically or substantially vertically with the second lateral end of the header.

15. A method of adjusting a mower comprising:

a header floatation system comprising:
- a trail frame;
- a header comprising a cutter bar generally located on the underside of the header;
- a floatation mechanism operably connected to the header at one end of the floatation mechanism and operably connected to the trail frame at an opposite end of the floatation mechanism;
- a first floatation adjustment array comprising at least a first contact point;
- a floatation mechanism mount connected to the trail frame or the header and comprising at least a second contact point; and
- a floatation mechanism fastener;
    - wherein the trail frame and the header are mechanically linked by at least one pivot point;
    - wherein the floatation mechanism is mechanically linked to the trail frame or the header through an attachment to the floatation mechanism mount;
    - wherein the first floatation adjustment array is mechanically linked to the trail frame or the header;
    - wherein either the first floatation adjustment array or the floatation mechanism mount comprises at least a third contact point;
- a second floatation adjustment array; and
- an apron connected to the second end of the floatation mechanism, the apron being pivotally connected to the second floatation adjustment array;
    - wherein the first floatation adjustment array is mechanically linked to the first end of the floatation mechanism;
    - wherein the second floatation adjustment array is mechanically linked to the second end of the floatation mechanism; and
    - wherein the floatation mechanism comprises a tension component chosen from: a coil spring, a torsion spring, and an air spring;
the method comprising moving the position of the floatation mechanism fastener from the first contact point to the third contact point along the path of the floatation mechanism adjustment array to position the floatation mechanism to a desired height.

16. The method of claim 15, wherein the header further comprises:
- a skid shoe;
- a skid shoe mount comprising at least a fourth contact point;
- a skid shoe adjustment array comprising at least a fifth contact point; and
- a skid shoe fastener;
    - wherein the skid shoe is mechanically linked to the cutter bar by at least one pivot point;
    - wherein the skid shoe mount is mechanically linked to the skid shoe;
    - wherein either the skid shoe mount or the skid shoe adjustment array comprises a sixth contact point; and
    - wherein at least one of either the skid shoe adjustment array or the skid shoe mount is mechanically linked to the trail frame;
the method further comprising moving the position of the skid shoe fastener from the fourth contact point to the sixth contact point of the skid shoe adjustment array to position the cutter bar to a desired height.

* * * * *